United States Patent
Gupta et al.

(10) Patent No.: US 10,667,280 B2
(45) Date of Patent: May 26, 2020

(54) SYSTEMS AND METHODS FOR ALLOCATING AT LEAST ONE WIRELESS CHANNEL TO AN ACCESS POINT

(71) Applicant: RELIANCE JIO INFOCOMM LIMITED, Mumbai-Maharashtra (IN)

(72) Inventors: Ajay Kumar Gupta, Maharashtra (IN); Vishal Vasant Oak, Karnataka (IN); Thomas John Schlangen, Chandler, AZ (US)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 0 days.

(21) Appl. No.: 16/088,702

(22) PCT Filed: Apr. 29, 2017

(86) PCT No.: PCT/IB2017/052513
§ 371 (c)(1),
(2) Date: Sep. 26, 2018

(87) PCT Pub. No.: WO2017/191541
PCT Pub. Date: Nov. 9, 2017

(65) Prior Publication Data
US 2019/0110301 A1    Apr. 11, 2019

(30) Foreign Application Priority Data
May 3, 2016 (IN) .............................. 201621015362

(51) Int. Cl.
*H04W 72/10* (2009.01)
*H04W 28/00* (2009.01)
(Continued)

(52) U.S. Cl.
CPC ........... *H04W 72/10* (2013.01); *H04W 16/02* (2013.01); *H04W 28/00* (2013.01); *H04W 84/12* (2013.01); *H04W 88/08* (2013.01)

(58) Field of Classification Search
None
See application file for complete search history.

(56) References Cited

U.S. PATENT DOCUMENTS 9,220,094 B2    12/2015 Chen et al.
2004/0203828 A1 * 10/2004 Mirchandani ......... H04W 16/02
                                                              455/452.1

(Continued)

FOREIGN PATENT DOCUMENTS

WO    2011-127445    10/2011
WO    2014-070669    5/2014

OTHER PUBLICATIONS

PCT International Search Report, International Application No. PCT/IB2017/052513, dated Jul. 28, 2017, pp. 1-2.

*Primary Examiner* — Brian S Roberts
(74) *Attorney, Agent, or Firm* — Hunton Andrews Kurth LLP

(57) ABSTRACT

Embodiments of the present disclosure relate to allocating at least one wireless channel to an access point by a central entity [104]. In one embodiment, a method is disclosed comprising: detecting at least two access points [for e.g. 102A, 102B] from a plurality of access points operating within at least one available wireless spectrum; prioritizing the at least two access points [for e.g. 102A, 102B] based on one of the increasing order and the decreasing order of a count of the one or more neighbouring access points; forming at least one group from the plurality of wireless channels and sequentially allocating at least one of the at
(Continued)

least one unallocated wireless channel to each of the at least two access points [for e.g. 102A, 102B].

14 Claims, 5 Drawing Sheets

(51) Int. Cl.
*H04W 16/02* (2009.01)
*H04W 84/12* (2009.01)
*H04W 88/08* (2009.01)

(56) References Cited

U.S. PATENT DOCUMENTS

2010/0085910 A1* 4/2010 Humblet ............... H04W 16/02
370/328
2014/0301328 A1* 10/2014 Yacovitch ............. H04W 16/02
370/329
2016/0007273 A1* 1/2016 Farid .................... H04W 48/16
370/329

* cited by examiner

SYSTEMS AND METHODS FOR ALLOCATING AT LEAST ONE WIRELESS CHANNEL TO AN ACCESS POINT

TECHNICAL FIELD

The present disclosure generally relates to wireless communication systems and is more specifically directed to optimal channel allocation to plurality of access points in a wireless spectrum.

BACKGROUND

In recent years, technologies such as Wi-Fi based on IEEE 802.11 standards have undergone tremendous growth and commercialization. In current market scenario, nearly all available user equipment (UE) with cellular capability support are integrated with Wi-Fi capability to connect with available Wi-Fi networks operating in the unlicensed frequency bands such as 2.4 GHz, or 5 GHz.

Implementation of 802.11ac and 802.11n with IEEE 802.11 standard (known as Wi-Fi) has enabled consumers to achieve high data rates over a wireless local network by utilizing wider channel widths. These wider channel widths specified in such implementations, such as 40 MHz, 80 MHz, 160 MHz, and 80 MHz, may be achieved via channel bonding on multiple consecutive or non-consecutive standard 20 MHz wide channels units (as proposed in early IEEE 802.11 standards, 802.11a/g) available in a wireless band.

Consequently, while allocating/assigning channels to a plurality of wireless access points (compliant to 802.11ac standard) for providing wireless services in a particular area, appropriate/optimal width constrained channels need to be selected for each access point available within the coverage. This, not only minimizes the conflict between access points due to overlapping channel widths, but also maximizes the utilization of available wireless band via wider channels, thereby improving the overall throughput of the wireless network.

Further, there exists several known solutions for using wider channel widths (specified in 802.11n and 802.11ac standards) in an optimum manner. One of the existing wireless solutions provide a static configuration to facilitate a fixed channel width mode to a plurality of access points providing wireless services in a particular area, wherein said width may be one of 160 MHz, 80 MHz, 40 MHz, 20 MHz and any such channel width that is currently available with 802.11ac standard.

An exemplary case of a typical network area comprises of four wireless access points deployed in hotspot areas for providing wireless services in the area to the users, wherein the access points operate on either of the different wireless channel widths specified in the 802.11ac standard. The access points receive information relating to their neighbouring access points along with their signal strength by scanning the available wireless band for a fixed time period or by static configuration. However, the static provisioning of wireless channel width poses certain limitations, one of which is overlap of wireless channels between two or more neighbouring access points due to scarcity of independent channels with the statically configured channel width value.

In an exemplary event of static configuration of 80 MHz channel width mode created for four access points that are neighbour to each other, the access points operate in an area/wireless band that allows only three independent 80 MHz wide channels. In such events, first two of the four access points will be allotted 2 separate channels of 80 MHz width; however, since there are only three available independent channels, the remaining two access points will share a common 80 MHz channel. This results in conflict between corresponding Base Service Stations (BSS) hosted by these two access points. The IEEE 802.11ac standard has specified a solution/technique to overcome the limitations occurred in static configuration by providing a mechanism to share a wide channel between two or more access points in an efficient manner. However, this mechanism is implemented only on firmware, and therefore may not be present on all wireless device for wireless services/operations.

Another limitation of the static provisioning of wireless bandwidth relates to underutilization of available wireless band. In an exemplary event of static configuration of 20 MHz channel width mode created for four access points that are neighbour to each other, the access points operate in an area where 120 MHz available spectrum comprises of six consecutive standard 20 MHz channels. In such events, four out of six independent 20 MHz wide channels are assigned to four of the APs, thereby resulting in 2 unassigned 20 MHz wide channels. Therefore, the unutilized 40 MHz bandwidth reduces total aggregate throughput.

Accordingly, in order to overcome the aforementioned problems inherent in the existing solutions for allocating bandwidth to access points, there exists a need of an efficient mechanism to sequentially allocate appropriately/optimally sized wireless channels to a plurality of wireless access points located in the available wireless band in optimum manner.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may relate to a method for allocating at least one wireless channel to an access point, the method being performed by a central entity, the method comprising: detecting at least two access points from a plurality of access points operating within at least one available wireless spectrum having a plurality of wireless channels, wherein the at least two access points are not allocated to at least one wireless channel, each of the at least two access points has a maximum operating channel width, and each of the plurality of wireless channels has a channel width; prioritizing the at least two access points based on one of an increasing order and a decreasing order of a count of the one or more neighbouring access points, wherein the one or more neighbouring access points comprising one of an allocated neighbouring access point and an unallocated neighbouring access point; forming at least one group from the plurality of wireless channels, wherein the plurality of wireless channels comprising at least one allocated wireless channel, at least one unallocated wireless channel and a combination thereof; and sequentially allocating at least one of the at least one unallocated wireless channel to each of the at least two access points based on the prioritisation of the at least two access points, comprising steps of: modifying the at least one group to form at least one modified group based on the unallocated neighbouring access point, wherein the at least one modified group comprising the at least two unallocated wireless channels, and the at least two unallocated wireless channels are at least one more than number of the unallocated neighbouring access point; and selecting a target group from the at least one modified group based on at least one of the maximum operating channel width of the at least two access points and the at least one modified group having a maximum channel width.

Further, the embodiments of the present disclosure encompass a system for allocating at least one wireless channel to an access point. The system comprising a central entity comprising: a detecting module configured to: detect at least two access points from a plurality of access points operating within at least one available wireless spectrum having a plurality of wireless channels, wherein the at least two access points are connected to the central entity through a communication channel, the at least two access points are not allocated to at least one wireless channel, each of the at least two access points has a maximum operating channel width, and each of the plurality of wireless channels has a channel width; a prioritization module configured to: prioritize the at least two access points based on one of an increasing order and a decreasing order of a count of the one or more neighbouring access points, wherein the one or more neighbouring access points comprising one of an allocated neighbouring access point and an unallocated neighbouring access point, and form at least one group from the plurality of wireless channels, wherein the plurality of wireless channels comprising at least one allocated wireless channel, at least one unallocated wireless channel and a combination thereof; and a communication module configured to: sequentially allocate at least one of the at least one unallocated wireless channel to each of the at least two access points based on the prioritisation of the at least two access points, comprising steps of: modifying the at least one group to form at least one modified group based on the unallocated neighbouring access point, wherein the at least one modified group comprising the at least two unallocated wireless channels, and the at least two unallocated wireless channels are at least one more than number of the unallocated neighbouring access point; and selecting a target group from the at least one modified group based on at least one of the maximum operating channel width of the at least two access points and the at least one modified group having a maximum channel width.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

DETAILED DESCRIPTION

Figure 1:
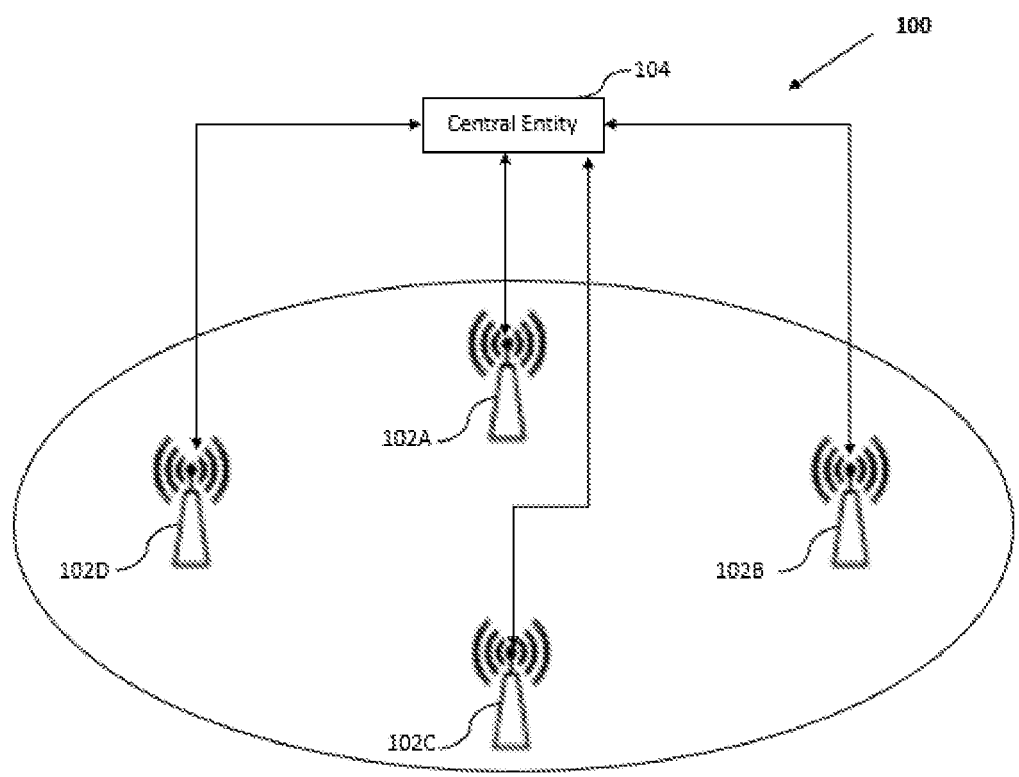
FIG. 1 illustrates system architecture of an exemplary communication wireless network [100] for allocating at least one wireless channel to an access point in accordance with an embodiment of the present disclosure.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure may relate to a mechanism for sequentially allocating at least one wireless channel to an access point that provides wireless services in a hotspot deployment environment. A central entity may be configured to identify at least one available wireless spectrum consisting of a plurality of wireless channels for detecting at least two access points from a plurality of access points operating within the at least one available wireless spectrum. Further, if the central entity determines that the at least two access points are not assigned to the at least one wireless channel, the central entity prioritizes the at least two access points and subsequently forms at least one group comprising at least one allocated wireless channel, at least two unallocated wireless channels and a combination thereof. Furthermore, the central entity sequentially allocates at least one of the at least two unallocated wireless channels to each of the at least two access points based on the prioritization of the at least two access points.

The central entity as used herein may include, but is not limited to, a centralized server present in a data centre and a cloud sever.

FIG. 1 illustrates an exemplary embodiment of the present disclosure which encompasses a system architecture for allocating at least one wireless channel to an access point. The system [100] may comprise a central entity [104] and at least two access points [for e.g. 102A, 102B], wherein the central entity [104] and the at least two access points [for e.g. 102A, 102B] may be connected to each other through a communication channel of one of an internet or a private network.

The at least two access points [for e.g. 102A, 102B] may be deployed in hotspot wireless area to provide wireless services in the area. In a preferred embodiment, the at least two access points [for e.g. 102A, 102B] are compliant to the IEEE 802.11ac standard and therefore operates on various wireless channel widths specified in 802.11ac standard, including, but not limiting to, 20 MHz, 40 MHz, 80 MHz and 160 MHz. Additionally, each of the at least two access points [for e.g. 102A, 102B] has a maximum operating channel width as specified in the IEEE 802.11ac standard to provide wireless services in the area. Further, the at least two access points [for e.g. 102A, 102B] present within the wireless area may be configured to receive information relating to the one or more neighbouring access points either by scanning the available wireless area for a fixed time period or by static configuration, wherein the information includes, but is not limited to, a signal strength of the access points [for e.g. 102A, 102B], a MAC address, a count of wireless channels and the maximum operating channel width of the at least two access points [for e.g. 102A, 102B]. The one or more neighbouring access points may be present within a coverage area of the at least two access points [for e.g. 102A, 102B], wherein the coverage area of the at least two access points [for e.g. 102A, 102B] is the maximum distance from the access points up to which the signal from the access points is within acceptable limit. For example and as illustrated in FIG. 1, the access point [102A] receives the information from the one or more neighbouring access points [102B, 102C and 102D] present within the coverage area of the access point [102A]. Furthermore, the at least two access points [for e.g. 102A, 102B] may be connected to the central entity [104].

The central entity [104] may be configured to identify at least one available wireless spectrum, wherein the at least one available wireless spectrum consists of a plurality of wireless channels having the channel width, wherein the channel width is a multiple of 20 MHz based on the 802.11ac standard. In a preferred embodiment, each of the plurality of wireless channels further comprises a starting frequency and an ending frequency. The central entity [104] may be further configured to detect the at least two access points [for e.g. 102A, 102B] from a plurality of access points operating in at least one available wireless spectrum. Pursuant to detection of the at least two access points [for e.g. 102A, 102B], the central entity [104] may receive information of at least one of the at least two access points [for e.g. 102A, 102B] and the one or more neighbouring access points, wherein the information of the at least two access points [for e.g. 102A, 102B] includes, but is not limited to, the signal strength of the at least two access points [for e.g. 102A, 102B] and the one or more neighbouring access points, the MAC address, the count of wireless channels and the maximum operating channel width of the access points [for e.g. 102A, 102B] and the one or more neighbouring access points.

On receiving the information, the central entity [104] may determine if the at least two access points [for e.g. 102A, 102B] are allocated to the at least one wireless channel. In an event, the at least two access points [for e.g. 102A, 102B] are not allocated to the at least one wireless channel, the central entity [104] may determine a count of the one or more neighbouring access points present within the coverage area of the at least two access points [for e.g. 102A, 102B], wherein the one or more neighbouring access points comprises one of an allocated access point and an unallocated access point, i.e. the one or more neighbouring access points are either pre-assigned to the at least one wireless channel or are not assigned to the at least one wireless channel. Subsequently, the central entity [104] may prioritise the at least two access points [for e.g. 102A, 102B] based on one of an increasing order and a decreasing order of the count of the one or more neighbouring access points. In an exemplary embodiment, the central entity [104] prioritises the at least two access points [for e.g. 102A, 102B] based on the increasing order of the one or more neighbouring access points, thereby giving higher priority to the access point having a higher number of the one or more neighbouring access points.

The central entity [104] may further form at least one group from the plurality of the wireless channels, wherein the plurality of the wireless channels comprises at least one allocated wireless channel, at least two unallocated wireless channels and a combination thereof. The formation of the at least one group is based on the channel width of the wireless channels and a channelization scheme specified for the available wireless spectrum based on the 802.11ac standard. In a preferred embodiment, the channels of the at least one group have similar channel width value based on at least one of the at least two access points [for e.g. 102A, 102B] and the one or more neighbouring access points.

Further, the central entity [104] may sequentially allocate at least one of the at least two unallocated wireless channels to each of the at least two access points [for e.g. 102A, 102B] based on the prioritization of the at least two access points [for e.g. 102A, 102B]. In an exemplary embodiment, at least one of the at least two unallocated wireless channels is consecutively allocated to each of the at least two access points [for e.g. 102A, 102B]. The sequential allocation of the at least two unallocated wireless channels to each of the at least two access points [for e.g. 102A, 102B] may initiate with modifying the at least one group to form at least one modified group based on the unallocated neighbouring access points by removing the allocated wireless channels i.e. the channels that are already allocated to the one or more neighbouring access points and have an overlapping frequency with other access points. As a result, the at least one modified group may comprise only the at least two unallocated wireless channels and not the allocated wireless channels. Also, the at least two unallocated wireless channels are at least one more than the number of the unallocated neighbouring access points. Thus, the number of the unallocated wireless channels is at least one more than the number of the unallocated neighbouring access points. In an embodiment, modification of the at least one group occurs by iterating over the one or more neighbouring access points, for each of the allocated neighbouring access points, thereby removing the allocated neighbouring access points from the at least one group.

Pursuant to the formation of the at least one modified group, the central entity [104] may select a target group from the at least one modified based on at least one of the maximum operating channel width of the at least two access points [for e.g. 102A, 102B] and the at least one modified group having the maximum channel width. The central entity [104] may further be configured to transmit a channel setting information to the at least two access points [for e.g. 102A, 102B], wherein the channel setting information includes, but is not limited to, a primary channel number and the selected channel width. In an embodiment, the channel setting information is manually transmitted to the at least two access points [for e.g. 102A, 102B] while in another embodiment, the channel setting information is transmitted automatically to the at least two access points [for e.g. 102A, 102B] through a communication channel between the central entity [104] and the at least two access points [for e.g. 102A, 102B]. In an exemplary embodiment, the central entity [104] may be configured to display the channel setting information to a user. Therefore, the target group, comprising the at least two unallocated wireless channels, is allocated to each of the at least two access points [for e.g. 102A, 102B] in such a manner that the holes (unallocated wireless channels) in the available wireless spectrum are minimised.

Figure 2:
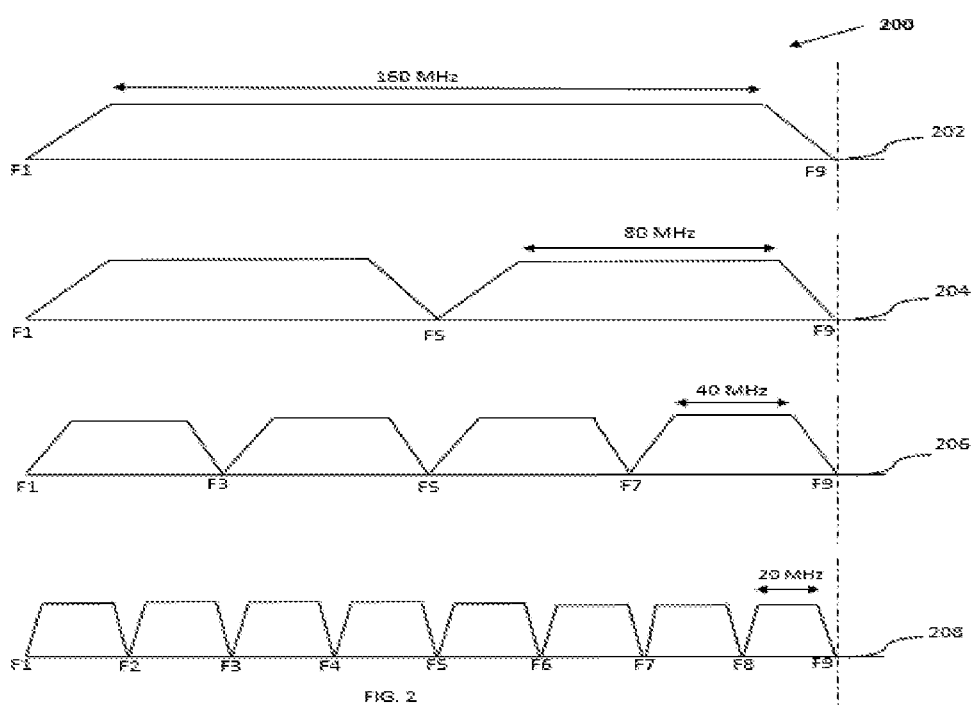
FIG. 2 illustrates an exemplary channelization scheme [200] for allocating at least one wireless channel to an access point in accordance with an embodiment of the present disclosure based on the 802.11ac standard.

As illustrated in FIG. 2, the present disclosure encompasses an exemplary channelization scheme [200] for allocating at least one wireless channel to at least one access point based on the IEEE 802.11ac standard by fragmenting a wireless spectrum. Following may be the possibilities [202, 204, 206 and 208] of fragmentation of a 160 MHz wireless spectrum into a number of wireless channels based on the one or more neighbouring access points such that each wireless channel is allocated to at least one access point, wherein each wireless channel has a starting frequency, ending frequency and the channel width:

1. [202]: 1 channel (F1-F9) having the channel width of 160 MHz;
2. [204]: 2 channels (F1-F5 and F5-F9) having the channel width of 80 MHz;
3. [206]: 4 channels (F1-F3, F3-F5, F5-F7 and F7-F9) having the channel width of 40 MHz; and
4. [208]: 8 channels (F1-F2, F2-F3, F3-F4, F4-F5, F5-F6. F6-F7, F7-F8 and F8-F9) having the channel width of 20 MHz.

Figure 3:
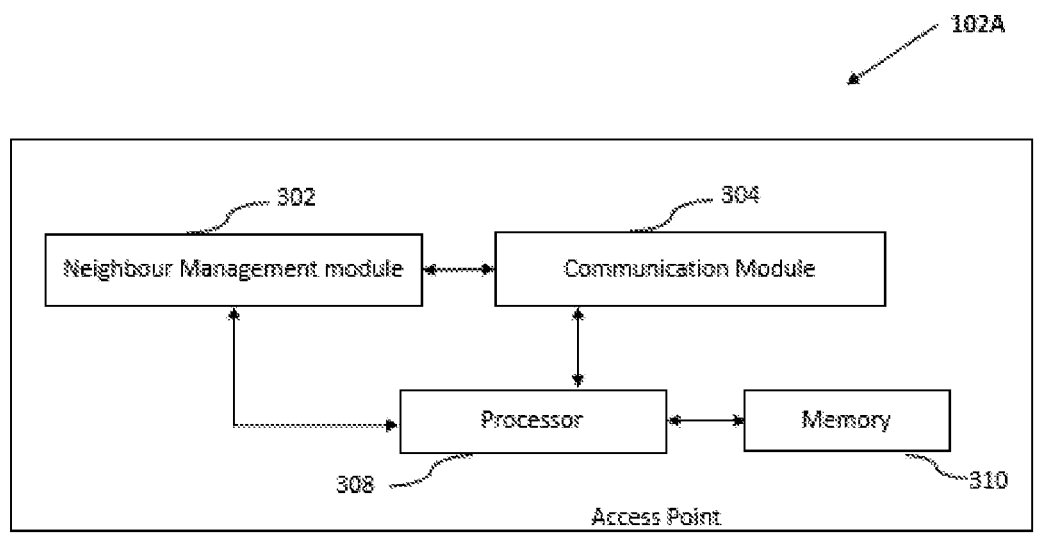
FIG. 3 illustrates an exemplary access point [for e.g. 102A] deployed in the wireless network for allocating at least one wireless channel to an access point in accordance with an embodiment of the present disclosure.

As illustrated in FIG. 3, the present disclosure encompasses a system architecture [300] for an exemplary access point [for e.g. 102A] deployed in the wireless network for allocating at least one wireless channel to an access point [for e.g. 102A]. The access point [for e.g. 102A] operates on wireless channel widths as specified in the IEEE 802.11ac standard to provide wireless services in the area. Additionally, the access point [for e.g. 102A] has the maximum operating channel width as specified in the IEEE 802.11ac standard to provide wireless services in the area. Further, the access point [for e.g. 102A] may comprise a neighbour management module [302], a communication module [304], a processor [308], and a memory [310].

The neighbour management module [302] of the access point [for e.g. 102A] may be configured to receive the information from the one or more neighbouring access point present within the coverage area of the access point [for e.g. 102A] either by scanning the available wireless area for a fixed time period or by static configuration, wherein the information includes, but is not limited to, a signal strength of the access points [for e.g. 102A, 102B], a MAC address, a count of wireless channels and the maximum operating channel width of the access points [for e.g. 102A, 102B]. Accordingly, the neighbour management module [302] may comprise monitoring and provisioning functions in order to monitor the one or more neighbouring access point. Further, neighbour management module [302] may be connected to the communication module [304] to transmit the information of at least one of the at least two access points [for e.g. 102A, 102B] and the one or more neighbouring access points.

On receiving the information from the neighbour management module [302], the communication module [304] may transmit the information to the central entity [104]. Also, the communication module [304] of the access point [for e.g. 102A] may be configured to receive the channel setting information of the access point [for e.g. 102A] from the central entity [104], wherein the channel setting information includes, but is not limited to, a primary channel number and the corresponding channel width. In an embodiment, the channel setting information is transmitted manually while in another embodiment, the channel setting information is transmitted automatically through the communication channel between the central entity [104] and the access point [for e.g. 102A].

Further, the processor [308] may be connected with neighbour management module [302] and the communication module [304] in order to process at least one of the channel setting information and the information relating to the access point [for e.g. 102A] and one or more neighbouring access points. The processor [308] as used herein may include, but is not limited to, processor or set of processors configured to perform operations, such as, for example, a microprocessor, a multi-core microprocessor, a digital signal processor, a collection of electronic circuits, or a combination thereof.

The memory [310] may be configured to store and maintain at least one of the channel setting information and the information relating to the access point [for e.g. 102A] and one or more neighbouring access points. The memory [310] may include, but not limited to, a volatile memory, non-volatile memory, a remote storage, a cloud storage, high-speed random access memory and/or non-volatile memory, such as one or more magnetic disk storage devices, one or more optical storage devices, and/or flash memory (e.g., NAND, NOR) or a combination thereof.

Figure 4:
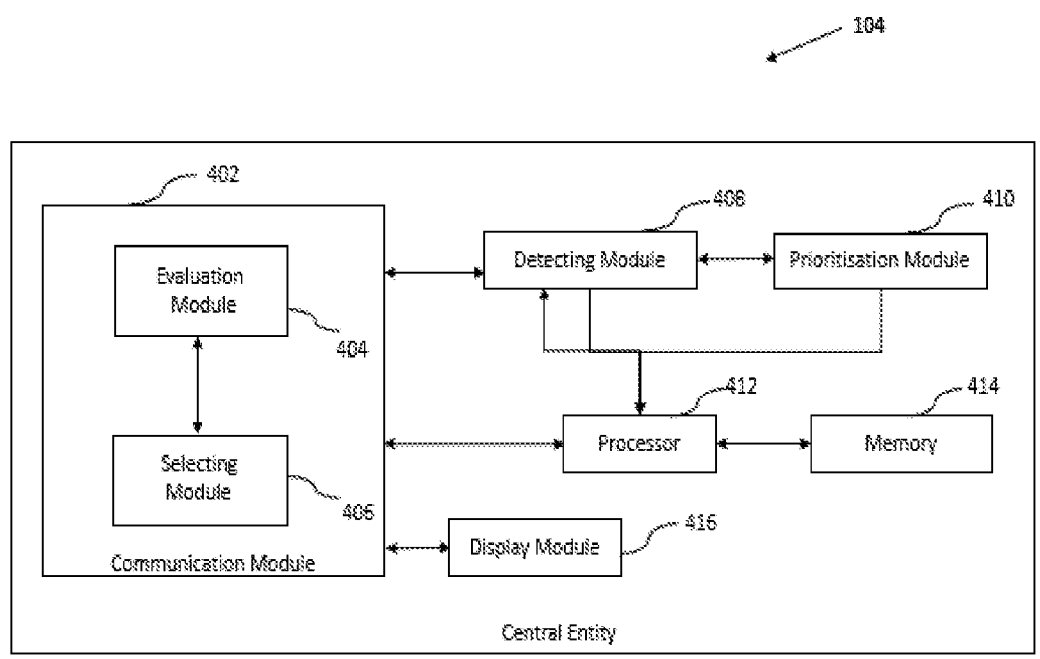
FIG. 4 illustrates an exemplary central entity [104] deployed in the wireless network for allocating at least one wireless channel to an access point in accordance with an embodiment of the present disclosure.

As illustrated in FIG. 4, the present disclosure encompasses a system architecture [400] for an exemplary central entity [104] deployed in the wireless network for allocating at least one wireless channel to an access point [for e.g. 102A]. The central entity [104] may comprise a detecting module [408], a prioritisation module [410], a communication module [402], a processor [412], a memory [414] and a display module [416].

The detecting module [408] of the central entity [104] may be configured to identify at least one available wireless spectrum, wherein the at least one available wireless spectrum consists of a plurality of wireless channels having the channel width that is a multiple of 20 MHz based on the IEEE 802.11ac standard. In a preferred embodiment, each of the plurality of wireless channels further comprises a starting frequency and an ending frequency. The detecting module [408] of the central entity [104] may be further configured to detect the at least two access points [for e.g. 102A, 102B] from a plurality of access points present within the coverage area of the at least one available wireless spectrum, wherein the coverage area of the at least one available wireless spectrum. Pursuant to detection of the at least two access points [for e.g. 102A, 102B], the detecting module [408] may receive information of at least one of the at least two access points [for e.g. 102A, 102B] and the one or more neighbouring access points to further determine if the at least two access points [for e.g. 102A, 102B] are allocated to the at least one wireless channel. In an event, the at least two access points [for e.g. 102A, 102B] are not allocated to the at least one wireless channel, the detecting module [408] may transmit the information to the prioritisation module [410] of the central entity [104].

On receiving the information from the detecting module [408], the prioritisation module [410] of the central entity [104] may be configured to determine a count of the one or more neighbouring access points present within the coverage area of the at least two access points [for e.g. 102A, 102B], wherein the one or more neighbouring access points comprises one of an allocated access point and an unallocated access point, i.e. the one or more neighbouring access points are either pre-assigned to the at least one wireless channel or are not assigned to the at least one wireless channel. Subsequently, the prioritisation module [410] may prioritise the at least two access points [for e.g. 102A, 102B] based on one of an increasing order and a decreasing order of the count of the one or more neighbouring access points.

In an exemplary embodiment, the central entity [104] prioritises the at least two access points [for e.g. 102A, 102B] based on the increasing order of the one or more neighbouring access points, thereby giving higher priority to the access points having higher number of the one or more neighbouring access points. Further, the prioritisation module [410] may form at least one group from the plurality of the wireless channels, wherein the plurality of the wireless channels comprises at least one allocated wireless channel, at least two unallocated wireless channels and a combination thereof. The formation of the at least one group is based on the channel width of the wireless channels and a channelization scheme specified for the available wireless spectrum based on the IEEE 802.11ac standard. In a preferred embodiment, the channels of the at least one group have similar channel width based on at least one of the at least two access points [for e.g. 102A, 102B] and the one or more neighbouring access points.

The communication module [402] of the central entity [104] may be configured to sequentially allocate at least one of the at least two unallocated wireless channels to each of the at least two access points [for e.g. 102A, 102B] based on the prioritization of the at least two access points [for e.g. 102A, 102B]. In an exemplary embodiment, each of the at least one of the at least two unallocated wireless channels is consecutively allocated to each of the at least two access points [for e.g. 102A, 102B]. Further, the communication module [402] may comprise an evaluation module [404] and a selection module [406]. The evaluation module [404] may be configured to modify the at least one group to form at least one modified group based on the unallocated neighbouring access points by removing the allocated wireless channels i.e. the channels that are already allocated to the one or more neighbouring access point and have an overlapping frequency with other access points. As a result, the at least one modified group comprises only the at least two unallocated wireless channels and not the allocated wireless channels, wherein the at least two unallocated wireless channels are at least one more than the number of the unallocated neighbouring access points. Thus, the number of the unallocated wireless channels is at least one more than the number of the unallocated neighbouring access points. In an embodiment, modification of the at least one group occurs by iterating over the one or more neighbouring access points, for each of the allocated neighbouring access points, thereby removing the allocated neighbouring access points from the at least one group.

Pursuant to the formation of the at least one modified group, the selection module [406], connected to the evaluation module [404], may be configured to select a target group from the at least one modified based on at least one of the maximum operating channel width of the at least two access points and the at least one modified group having the maximum channel width.

The display module [416], connected to the communication module [402], may further transmit the channel setting information to the at least two access points [for e.g. 102A, 102B], wherein the channel setting information includes, but is not limited to, the primary channel number and the maximum operating channel width of the at least two access points [for e.g. 102A, 102B]. In an embodiment, the channel setting information is manually transmitted while in another embodiment, the channel setting information is transmitted automatically through the communication channel between the central entity [104] and the at least two access points [for e.g. 102A, 102B]. In an exemplary embodiment, the display module [416] displays the channels setting information to the user.

Further, the processor [412] may be connected with communication module [402], detecting module [408] and the prioritisation module [410] in order to process at least one of the channel setting information and the information relating to the at least two access points [for e.g. 102A, 102B] and the one or more neighbouring access points. The processor [412] as used herein may include, but is not limited to, processor or set of processors configured to perform operations, such as, for example, a microprocessor, a multi-core microprocessor, a digital signal processor, a collection of electronic circuits, or a combination thereof.

The memory [414] may be configured to store and maintain at least one of the channel setting information and the information relating to the access point [for e.g. 102A] and the one or more neighbouring access points. The memory [310] may include, but not limited to, a volatile memory, non-volatile memory, a remote storage, a cloud storage, high-speed random access memory and/or non-volatile memory, such as one or more magnetic disk storage devices, one or more optical storage devices, and/or flash memory (e.g., NAND, NOR) or a combination thereof.

Figure 5:
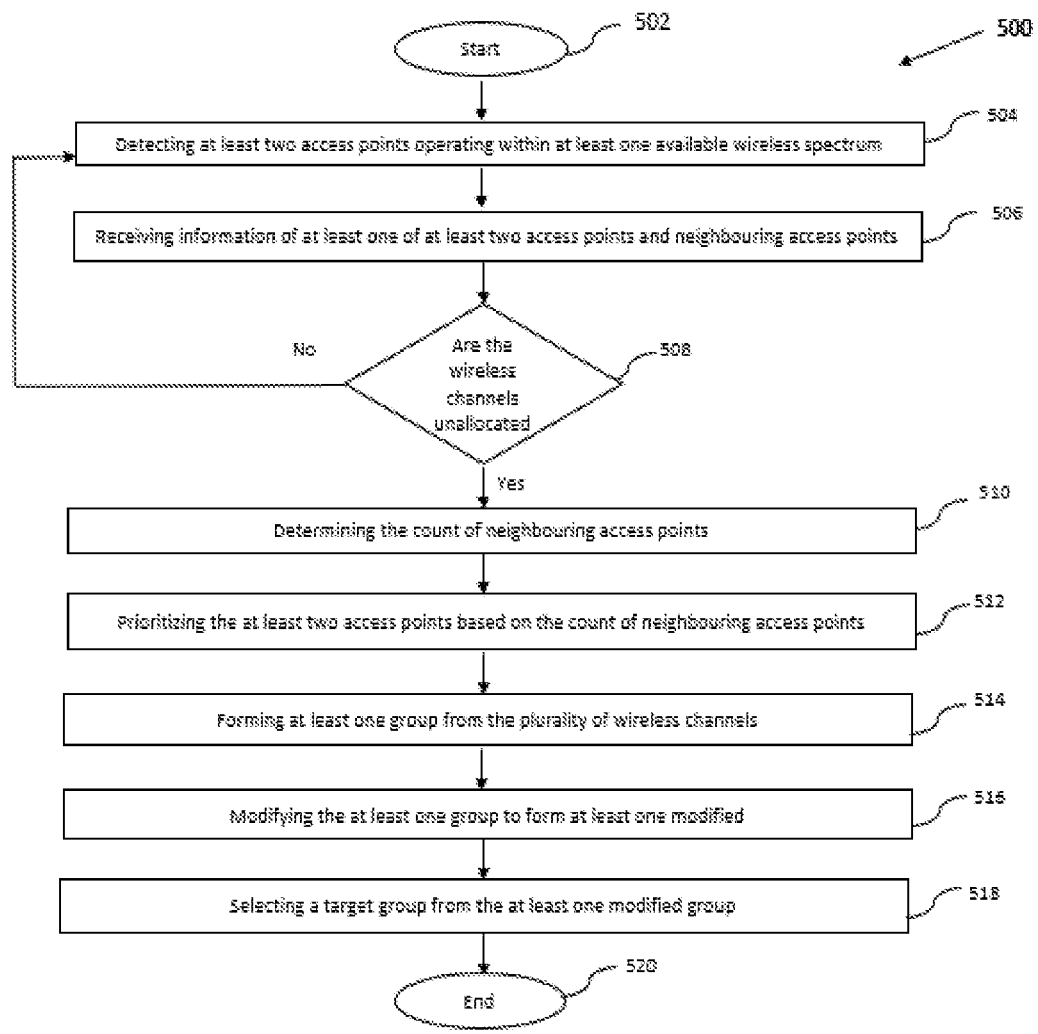
FIG. 5 illustrates an exemplary method flow diagram [500] comprising the method steps being performed by the central entity for allocating at least one wireless channel to an access point in accordance with an embodiment of the present disclosure.

As illustrated in FIG. 5, the present disclosure encompasses an exemplary method [500] for allocating the at least one wireless channel to an access point in accordance with an embodiment of the present disclosure, wherein the method may be performed at the central entity [104]. The following includes detailed steps involved in allocation of the at least one wireless channel. The method step may initiate at step 502 where the central entity [104] may be configured to identify at least one available wireless spectrum consisting of a plurality of wireless channels having the channel width, wherein the channel width is a multiple of 20 MHz based on the IEEE 802.11ac standard.

At step 504, the central entity [104] may be further configured to detect the at least two access points [for e.g. 102A, 102B] from a plurality of access points present within the coverage area of the at least one available wireless spectrum.

At step 506, the central entity [104] may receive information of at least one of the at least two access points [for e.g. 102A, 102B] and the one or more neighbouring access points, wherein the information of the at least two access points [for e.g. 102A, 102B] includes, but is not limited to, the signal strength of the access points [for e.g. 102A, 102B] and the one or more neighbouring access points, the MAC address, the count of wireless channels and the maximum operating channel width of the access points [for e.g. 102A, 102B] and the one or more neighbouring access points.

At step 508, the central entity [104] may determine if the at least two access points [for e.g. 102A, 102B] are allocated to the at least one wireless channel. In an event, the at least two access points [for e.g. 102A, 102B] are not allocated to the at least one wireless channel, the method [500] may proceed to step 510, or else the method may go to step 504 and may start detection process again.

At step 510, the central entity [104] may determine the count of the one or more neighbouring access points present within the coverage area of the at least two access points [for e.g. 102A, 102B], wherein the one or more neighbouring access points comprises one of an allocated access point and an unallocated access point, i.e. the one or more neighbouring access points are either pre-assigned to the at least one wireless channel or are not assigned to the at least one wireless channel.

At step 512, the central entity [104] may prioritise the at least two access points [for e.g. 102A, 102B] based on one of the increasing order and the decreasing order of the count of the one or more neighbouring access points. In an exemplary embodiment, the central entity [104] prioritises the at least two access points [for e.g. 102A, 102B] based on the increasing order of the one or more neighbouring access points, thereby giving higher priority to the access points having the higher number of the one or more neighbouring access points.

At step 514, the central entity [104] may form at least one group from the plurality of the wireless channels, wherein the plurality of the wireless channels comprises at least one allocated wireless channel, at least two unallocated wireless channels and a combination thereof. The formation of the at least one group is based on the channel width of the wireless channels and a channelization scheme specified for the available wireless spectrum based on the IEEE 802.11ac standard.

At step 516, the central entity [104] may modify the at least one group to form at least one modified group based on the unallocated neighbouring access points by removing the channels that are already allocated to the one or more neighbouring access point and have an overlapping frequency with other access points. As a result, the at least one modified group comprises only the at least two unallocated wireless channels and not the allocated wireless channels, wherein the at least two unallocated wireless channels are at least one more than the number of the unallocated neighbouring access points. In an embodiment, modification of the at least one group occurs by iterating over the one or more neighbouring access points, for each of the allocated neighbouring access points, thereby removing the allocated neighbouring access points from the at least one group.

At step 518, the central entity [104] may select a target group from the at least one modified group based on at least one of the maximum operating channel width of the at least two access points [for e.g. 102A, 102B] and the at least one modified group having the maximum channel width. The target group may comprise the at least two unallocated wireless channels.

At step 520, the central entity [104] may be configured to transmit the channel setting information to the at least two access points [for e.g. 102A, 102B] in any one of manual manner and automatic manner through the communication channel between the central entity [104] and the at least two access points [for e.g. 102A, 102B]. In an exemplary embodiment, the central entity [104] is configured to display the channel setting information to a user.

At step 522, the method may terminate with sequential allocation of at least one of the at least two unallocated wireless channels to each of the at least two access points [for e.g. 102A, 102B] based on the prioritization of the at least two access points [for e.g. 102A, 102B]. In an exemplary embodiment, each of the at least one of the at least two unallocated wireless channels is consecutively allocated to each of the at least two access points [for e.g. 102A, 102B]. The present disclosure encompasses sequential allocation of the wireless channels in such a manner that the holes (unallocated wireless channels) in the available wireless spectrum are minimised.

Though a limited number of the central entity [104], the access points [102A, 102B, 102C and 102D], the neighbouring access points and the links/connections/interfaces, have been shown in the figures; however, it will be appreciated by those skilled in the art that the system [100] of the present disclosure encompasses any number and varied types of the entities/elements such as the interfaces, the central entity [104], the access points [102A, 102B, A03C and 102D] and the neighbouring access points.

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

The invention claimed is:

1. A method for allocating at least one wireless channel to an access point, the method being performed by a central entity, the method comprising:
  detecting at least two access points from a plurality of access points operating within at least one available wireless spectrum having a plurality of wireless channels, wherein
    the at least two access points are not allocated to at least one wireless channel,
    each of the at least two access points has a maximum operating channel width, and
    each of the plurality of wireless channels has a channel width;
  prioritizing the at least two access points based on one of an increasing order and a decreasing order of a count of neighbouring access point, wherein the neighbouring access point comprising one of an allocated neighbouring access point and an unallocated neighbouring access point;
  forming at least one group from the plurality of wireless channels, wherein the plurality of wireless channels comprising at least one allocated wireless channel, at least two unallocated wireless channels and a combination thereof; and
  sequentially allocating at least one of the at least two unallocated wireless channels to each of the at least two access points based on the prioritisation of the at least two access points, comprising steps of:
    modifying the at least one group to form at least one modified group based on the unallocated neighbouring access point, wherein
      the at least one modified group comprising the at least two unallocated wireless channels, and
      the at least two unallocated wireless channels are at least one more than number of the unallocated neighbouring access point; and
    selecting a target group from the at least one modified group based on at least one of the maximum operating channel width of the at least two access points and the at least one modified group having a maximum channel width.

2. The method as claimed in claim 1, further comprising receiving an information of at least one of the at least two access points and the neighbouring access points.

3. The method as claimed in claim 2, wherein the information of the at least two access points comprises a signal strength, a MAC address, a count of wireless channels and the maximum operating channel width of the at least two access points.

4. The method as claimed in claim 1, further comprising transmitting a channel setting information to the at least two access points.

5. The method as claimed in claim 4, wherein the channel setting information includes a primary channel number and the maximum operating channel width.

6. The method as claimed in claim 1, further comprising displaying of a channel allocation information to the at least two access points.

7. The method as claimed in claim 1, wherein each of the plurality of wireless channels further comprising a starting frequency and an ending frequency.

8. The method as claimed in claim 1, wherein the channel width is a multiple of 20 MHz based on an 802.11 standard.

9. The method as claimed in claim 1, wherein the maximum operating channel width is maximum channel width based on the 802.11 standard.

10. The method as claimed in claim 1, wherein the neighbouring access point is present within a coverage area of the at least two access points.

11. The method as claimed in claim 1, wherein the forming the at least one group is based on the channel width and a channelization scheme specified for the available wireless spectrum.

12. The method as claimed in claim 1, wherein modifying the at least one group comprising removing the wireless channels already allocated to the neighbouring access point.

13. A system for allocating at least one wireless channel to an access point, the system comprising:
 a central entity comprising a processor configured to:
  detect at least two access points from a plurality of access points operating within at least one available wireless spectrum having a plurality of wireless channels, wherein
   the at least two access points are connected to the central entity through a communication channel,
   the at least two access points are not allocated to at least one wireless channel,
   each of the at least two access points has a maximum operating channel width, and
   each of the plurality of wireless channels has a channel width;
  prioritize the at least two access points based on one of an increasing order and a decreasing order of a count of neighbouring access point, wherein the neighbouring access point comprising one of an allocated neighbouring access point and an unallocated neighbouring access point, and
  form at least one group from the plurality of wireless channels, wherein the plurality of wireless channels comprising at least one allocated wireless channel, at least two unallocated wireless channels and a combination thereof; and
  sequentially allocate at least one of the at least two unallocated wireless channels to each of the at least two access points based on the prioritisation of the at least two access points, comprising steps of:
   modifying the at least one group to form at least one modified group based on the unallocated neighbouring access point, wherein
    the at least one modified group comprising the at least two unallocated wireless channels, and
    the at least two unallocated wireless channels are at least one more than number of the unallocated neighbouring access point; and
   selecting a target group from the at least one modified group based on at least one of the maximum operating channel width of the at least two access points and the at least one modified group having a maximum channel width.

14. The system as claimed in claim 13, the processor is further configured to display a channel allocation information to the at least two access points.

* * * * *